United States Patent
Nakamura et al.

(10) Patent No.: US 7,898,720 B2
(45) Date of Patent: Mar. 1, 2011

(54) FARADAY ROTATOR

(75) Inventors: Nobuo Nakamura, Tokyo (JP);
Koichiro Maki, Chiba (JP)

(73) Assignee: Sumitomo Metal Mining Co., Ltd., Tokyo (JP)

( * ) Notice: Subject to any disclaimer, the term of this patent is extended or adjusted under 35 U.S.C. 154(b) by 40 days.

(21) Appl. No.: 12/372,159

(22) Filed: Feb. 17, 2009

(65) Prior Publication Data

US 2009/0237771 A1 Sep. 24, 2009

(30) Foreign Application Priority Data

Mar. 24, 2008 (JP) .............................. 2008-075097

(51) Int. Cl.
*G02F 1/09* (2006.01)
(52) U.S. Cl. ...................................... 359/280; 359/281
(58) Field of Classification Search .................. 359/280
See application file for complete search history.

(56) References Cited

U.S. PATENT DOCUMENTS 4,856,878 A * 8/1989 Wilson et al. ............... 359/283
7,206,116 B2 4/2007 Fehn
2005/0225831 A1 * 10/2005 Fehn et al. .................. 359/280

FOREIGN PATENT DOCUMENTS

| JP | 61-114420 | 7/1986 |
| JP | 2004-302412 A1 | 10/2004 |
| JP | 2007-248779 A1 | 9/2007 |

* cited by examiner

*Primary Examiner* — Jordan M. Schwartz
*Assistant Examiner* — James C Jones
(74) *Attorney, Agent, or Firm* — Kratz, Quintos & Hanson, LLP

(57) ABSTRACT

A Faraday rotator having a magnet member constituted of a first magnet standing magnetized in the direction perpendicular to the optical axis and taken toward the optical axis, a second magnet standing magnetized in the direction perpendicular to the optical axis and taken against the optical axis, and a third magnet disposed between these magnets and standing magnetized in the direction parallel to the optical axis and taken toward the first magnet from the second magnet. A through-hole (hollow spaces) inside which a Faraday element is disposed, is provided through the center of these magnets and, where the length of the first magnet and that of the second magnet in the optical-axis direction are both represented by $L_2$ and the length of the third magnet in the optical-axis direction is represented by $L_3$, the relationship of the following Expression (1) is established:

$$L_2/10 \leq L_3 \leq L_2. \qquad \text{Expression (1)}$$

11 Claims, 4 Drawing Sheets

FARADAY ROTATOR

BACKGROUND OF THE INVENTION

1. Field of the Invention

This invention relates to a magnetic optical device which is used in optical communication systems, laser processing systems and so forth. More particularly, it relates to an improvement in a Faraday rotator used in, e.g., an optical isolator by means of which light emitted from a light source and reflected at an end face of an optical element is prevented from returning to the light source.

2. Description of the Related Art

The Faraday rotator is a functional element consisting basically of a Faraday element and a magnet which applies a magnetic field to this Faraday element to produce Faraday effect. It is used in magnetic optical devices such as an optical isolator which is necessary to intercept light returning to a semiconductor laser to stabilize its lasing; the semiconductor laser being used in optical communication systems, laser processing systems and so forth.

FIG. 1 is a sectional view of a fundamental Faraday rotator used at present in optical communication systems. In FIG. 1, reference numeral 10 denotes a permanent magnet (a magnet member) standing magnetized in the optical-axis direction (shown by black arrows), which commonly has the shape of a cylinder and into a through-hole of which a Faraday element 11 is kept inserted. The Faraday element 11 produces the Faraday effect by the aid of a magnetic field formed in the optical-axis direction in the through-hole made in the permanent magnet 10. Conventionally, the wavelength band of light that is used in optical communication systems is in the range of from 1.3 µm to 1.7 µm, and, in some optical isolators, the Faraday rotator has been used in such a form that a rare earth iron garnet film is inserted as the Faraday element into the permanent magnet.

In recent years, there is an increasing demand for optical isolators used to protect semiconductor lasers which are used when fiber lasers for processing machines are excited. The wavelength of light used here is a shorter wavelength than the optical communication band, which is chiefly a wavelength of around 1 µm. Then, at such a wavelength of around 1 µm, the rare earth iron garnet film has too large absorption of light to be durable to its use. Accordingly, a paramagnetic material such as terbium-gallium-garnet (hereinafter simply "TGG" in some cases) or terbium glass is used as the Faraday element.

Especially where the Faraday rotator is used in the optical-isolator, the plane of polarization of light is rotated by the aid of the Faraday effect, and it must be rotated at an angle (hereinafter "Faraday rotation angle") of 45 degrees (hereinafter also "45°").

It comes to Faraday rotation angle=V×L×H where the length of a Faraday element is represented by L, the Verdet constant by V, and the magnetic field in the optical-axis direction by H.

The Verdet constant is spatially invariable, but the magnetic field formed by a magnet in the optical-axis direction is not necessarily invariable. Hence, in reality, it comes to:

$$\text{Faraday rotation angle} = \Sigma V \cdot H(L) \cdot \Delta L. \quad \text{Expression (2)}$$

However, the paramagnetic material such as TGG or terbium glass has a small Verdet constant, and its ability to rotate the plane of polarization is so small that it may require a strong magnetic field. As the result, this has made it necessary for the paramagnetic material to be of large size which is long in the optical-axis direction, and at the same time has made huge the permanent magnet as well that magnetizes this paramagnetic material.

Then, making the paramagnetic material and permanent magnet huge not only leads to an increase in cost, but also, because of a strong leak magnetic field, makes it difficult to assemble the optical isolator and further to incorporate the optical isolator in the device.

In addition, where the paramagnetic material has a long size in the optical-axis direction, the paramagnetic material absorbs light to come to be of high temperature when laser light is transmitted therethrough, and this makes the Faraday rotation angle deviate from 45°, also resulting in a lowering of the performance required as the optical isolator.

As a means by which such problems can be resolved, a Faraday rotator has already been developed in which, as shown in FIG. 5, a magnet member having a through-hole is made up of a first magnet 1 standing magnetized in the direction of magnetization that is perpendicular to the optical axis and the direction taken toward the optical axis and a second magnet 2 standing magnetized in the direction of magnetization that is perpendicular to the optical axis and the direction taken against the optical axis, and a Faraday element 5 is disposed inside the through-hole of the magnet member, so as to be improved in magnetic field strength for the Faraday element 5 [see Japanese Patent Laid-open Application No. 2004-302412 (hereinafter "Patent Document 1") and Japanese Patent Laid-open Application No. 2007-248779 (hereinafter "Patent Document 2")].

Thus, the means disclosed in these Patent Documents 1 and 2 has enabled improvement in magnetic field strength for the Faraday element. However, in order to make the Faraday rotator more compact, it is sought to develop a stronger structure for the magnet member.

Now, to resolve the problem that the Faraday rotation angle may deviate because of a temperature rise of the paramagnetic material (Faraday element), a method is considered effective in which a plurality of short paramagnetic materials are set in combination so as to improve heat dissipation properties, e.g., a method in which two Faraday rotators that provide a Faraday rotation angle of 22.5 degrees are connected in series.

However, if Faraday rotators as disclosed in Patent Document 1 are connected in series, there is a problem that the magnetic field applied to the Faraday elements may result in a low strength unless a sufficient space is provided between the two Faraday rotators.

A method may also be contemplated in which the structure of the optical isolator disclosed in Patent Document 2 is applied, which has two Faraday rotators. However, this optical isolator disclosed in Patent Document 2 is a device which functions as such in virtue of the structure of what is called a semi-duple type optical isolator in which a polarizer is disposed between Faraday rotators providing a Faraday rotation angle of 45 degrees (such an optical isolator with a polarizer disposed between Faraday rotators is called the semi-duple type optical isolator structure, where Faraday rotators providing a Faraday rotation angle of 45 degrees are used). Thus, if the Faraday rotation angle provided by the two Faraday elements is set at 22.5 degrees under the make-up of the magnets disclosed in Patent Document 2, the device can not function effectively when an optical isolator is made up using them in combination with the polarizer.

SUMMARY OF THE INVENTION

The present invention has been made taking note of such problems, and what it aims is to provide a more compact (small-size) Faraday rotator and also to provide a compact Faraday rotator which can function effectively as the Faraday rotator even where two sets of this Faraday rotator are connected in series.

That is, according to a first embodiment, the present invention is a Faraday rotator which comprises a magnet member having at its center a through-hole through which light is to pass and a Faraday element comprising a paramagnetic material which is disposed inside the through-hole and through which the light is to be transmitted, wherein;

the magnet member is constituted of a first magnet standing magnetized in the direction of magnetization that is perpendicular to the optical axis and the direction taken toward the optical axis, a second magnet standing magnetized in the direction of magnetization that is perpendicular to the optical axis and the direction taken against the optical axis, and a third magnet disposed between the first magnet and the second magnet and standing magnetized in the direction of magnetization that is parallel to the optical axis and the direction taken toward the first magnet from the second magnet; hollow spaces constituting the through-hole of the magnet member are provided at the centers of the first and second magnets and third magnet; the Faraday element is disposed at a central portion in the length direction of the through-hole constituted of these hollow spaces; and, where the length of the first magnet and that of the second magnet in the optical-axis direction are both represented by $L_2$ which are equal to each other and the length of the third magnet in the optical-axis direction is represented by $L_3$, the relationship of the following Expression (1) is established:

$$L_2/10 \leq L_3 \leq L_2. \quad \text{Expression (1)}$$

According to a second embodiment, the present invention is a Faraday rotator which comprises a magnet member having at its center a through-hole through which light is to pass and a Faraday element comprising a paramagnetic material which is disposed inside the through-hole and through which the light is to be transmitted, wherein;

two sets of the Faraday rotator according to the first embodiment of the present invention are connected in series in the optical-axis direction, where a pair of fourth magnets constituted of an inside magnet having a hollow space communicating with through-holes of a first Faraday rotator and a second Faraday rotator and an outside magnet having a hollow space larger than the outer diameter of the inside magnet and into the hollow space of which the whole inside magnet is kept fitted is disposed between the first Faraday rotator and the second Faraday rotator and in which the inside magnet and the outside magnet stand magnetized in the directions of magnetization that are parallel to the optical axis and the directions opposite to each other.

The Faraday rotator according to the first embodiment of the present invention is characterized in that the magnet member is constituted of a first magnet standing magnetized in the direction of magnetization that is perpendicular to the optical axis and the direction taken toward the optical axis, a second magnet standing magnetized in the direction of magnetization that is perpendicular to the optical axis and the direction taken against the optical axis, and a third magnet disposed between the first magnet and the second magnet and standing magnetized in the direction of magnetization that is parallel to the optical axis and the direction taken toward the first magnet from the second magnet; hollow spaces constituting the through-hole of the magnet member are provided at the centers of the first and second magnets and third magnet; the Faraday element is disposed at a central portion in the length direction of the through-hole constituted of these hollow spaces; and, where the length of the first magnet and that of the second magnet in the optical-axis direction are both represented by $L_2$ which are equal to each other and the length of the third magnet in the optical-axis direction is represented by $L_3$, the relationship of the above Expression (1) is established.

Thus, compared with the means disclosed in Patent Documents 1 and 2, the magnetic field strength for the Faraday element can be more improved in virtue of the action of the third magnet standing magnetized in the direction of magnetization that is parallel to the optical axis and the direction taken toward the first magnet from the second magnet. Hence, in the Faraday element, its length dimension in the optical-axis direction is reduced and this can make the Faraday rotator much more compact.

The Faraday rotator according to the second embodiment of the present invention is also characterized in that two sets of the Faraday rotator according to the first embodiment of the present invention are connected in series in the optical-axis direction, where a pair of fourth magnets constituted of an inside magnet having a hollow space communicating with through-holes of a first Faraday rotator and a second Faraday rotator and an outside magnet having a hollow space larger than the outer diameter of the inside magnet and into the hollow space of which the whole inside magnet is kept fitted is disposed between the first Faraday rotator and the second Faraday rotator and in which the inside magnet and the outside magnet stand magnetized in the directions of magnetization that are parallel to the optical axis and the directions opposite to each other.

Thus, in virtue of the action of the pair of fourth magnets constituted of an inside magnet and an outside magnet and in which the inside magnet and the outside magnet stand magnetized in the directions of magnetization that are parallel to the optical axis and the directions opposite to each other, the magnetic field applied to the Faraday elements can not easily come to result in a low strength even where the first Faraday rotator and the second Faraday rotator are connected in series without providing any sufficient space between them. Hence, the Faraday elements can be kept from rising in temperature because of absorption of light, and this can make the Faraday rotator much more compact while keeping its Faraday rotation angle stable.

DESCRIPTION OF THE PREFERRED EMBODIMENTS

Figure 1:
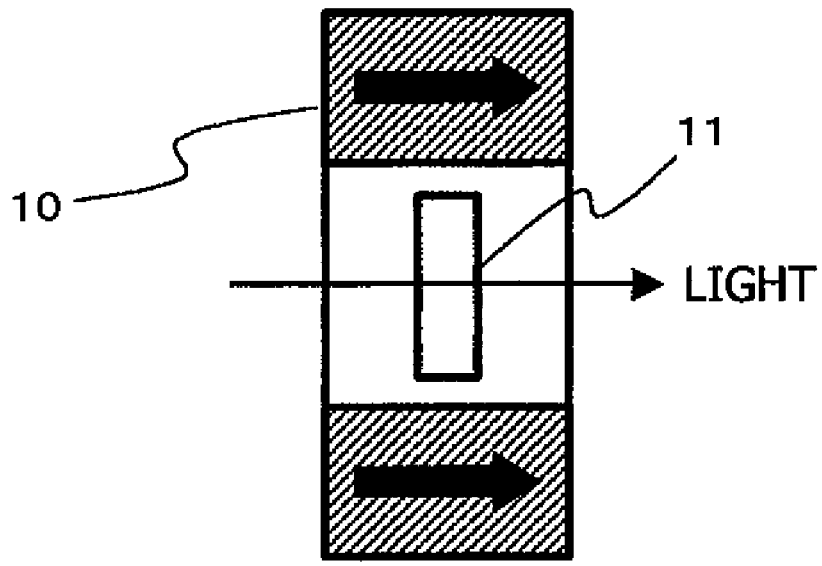
FIG. 1 is a schematic sectional view of a fundamental Faraday rotator used in optical communication systems.

The present invention is described below in detail.

First, the Faraday rotator according to the first embodiment of the present invention, which has a magnet member having at its center a through-hole through which light is to pass and a Faraday element made up of a paramagnetic material which is disposed inside the through-hole and through which the light is to be transmitted, is characterized as follows.

The magnet member is constituted of a first magnet standing magnetized in the direction of magnetization that is perpendicular to the optical axis and the direction taken toward the optical axis, a second magnet standing magnetized in the direction of magnetization that is perpendicular to the optical axis and the direction taken against the optical axis, and a third magnet disposed between the first magnet and the second magnet and standing magnetized in the direction of magnetization that is parallel to the optical axis and the direction taken toward the first magnet from the second magnet. Hollow spaces constituting the through-hole of the magnet member are provided at the centers of the first and second magnets and third magnet, and a Faraday element is disposed at a central portion in the length direction of the through-hole constituted of these hollow spaces. Where the length of the first magnet and that of the second magnet in the optical-axis direction are both represented by $L_2$ which are equal to each other and the length of the third magnet in the optical-axis direction is represented by $L_3$, the relationship of the following Expression (1) is established:

$$L_2/10 < L_3 < L_2.\qquad\text{Expression (1)}$$

In the above, the third magnet standing magnetized in the direction of magnetization that is parallel to the optical axis and the direction taken toward the first magnet from the second magnet plays an auxiliary role to more strengthen the magnetic field to be formed by the mutual action of the first magnet and second magnet. If its length in the optical-axis direction is too small, the role as an auxiliary magnet can not be made to play well. If on the other hand it is too large, the magnetic field to be produced by the mutual action of the first magnet and second magnet may inevitably weaken by contraries. Hence, its length is set within the range of Expression (1).

As the second embodiment of the present invention, two sets of the Faraday rotator described above may be connected in series in the optical-axis direction, where a pair of fourth magnets constituted of an inside magnet having a hollow space communicating with through-holes of a first Faraday rotator and a second Faraday rotator and an outside magnet having a hollow space larger than the outer diameter of the inside magnet and into the hollow space of which the whole inside magnet is kept fitted is disposed between the first Faraday rotator and the second Faraday rotator. The inside magnet and the outside magnet stand magnetized in the directions of magnetization that are parallel to the optical axis and the directions opposite to each other.

Where two sets of the above Faraday rotator are connected in series, the magnetic field to be applied to the Faraday element may inevitably weaken because of the magnetic line of force that extends from the first Faraday rotator to the second Faraday rotator.

Accordingly, the pair of fourth magnets constituted of the inside magnet and the outside magnet which stand magnetized in the directions of magnetization that are each other inversely parallel to the optical-axis direction is disposed between the first Faraday rotator and the second Faraday rotator to cancel the magnetic line of force that extends from the first Faraday rotator to the second Faraday rotator, thus the magnetic field to be applied to the Faraday element can be prevented from decreasing in strength. In that case, the length of the pair of fourth magnets in the optical-axis direction may preferably be ½ or more of the length $L_2$ of the first magnet in the optical-axis direction.

Figure 7:
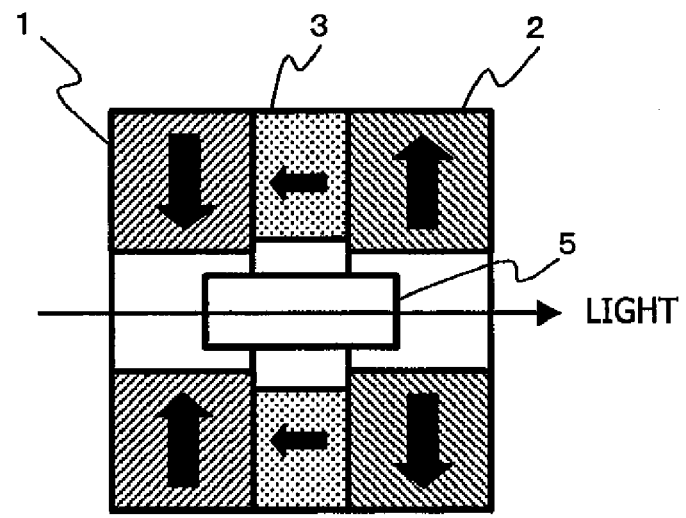
FIG. 7 is a schematic sectional view of a Faraday rotator according to a modification of the present invention.

A very strong magnetic field formed by the mutual action of the first magnet and second magnet may also come about in the vicinity of the hollow space (through-hole) of the third magnet. Hence, depending on the residual magnetic flux density and coercive force the magnet used as the third magnet has, a difficulty may come about such that demagnetization or magnetization reversal occurs in the vicinity of the hollow space (through-hole) of the third magnet to make the third magnet less effective. In such a case, as shown in FIG. 7 the diameter of the whole or some part of a hollow space (through-hole) of a third magnet 3 must be set larger than hollow spaces (through-hole) of a first magnet 1 and a second magnet 2 so as to remove the part where the demagnetization or magnetization reversal may occur.

The first magnet and the second magnet may each be made up in combination of a plurality of magnet pieces. This is preferable in view of the manufacture of magnets.

The present invention is described below in greater detail by giving Examples with reference to the accompanying drawings.

Example 1

Figure 2:
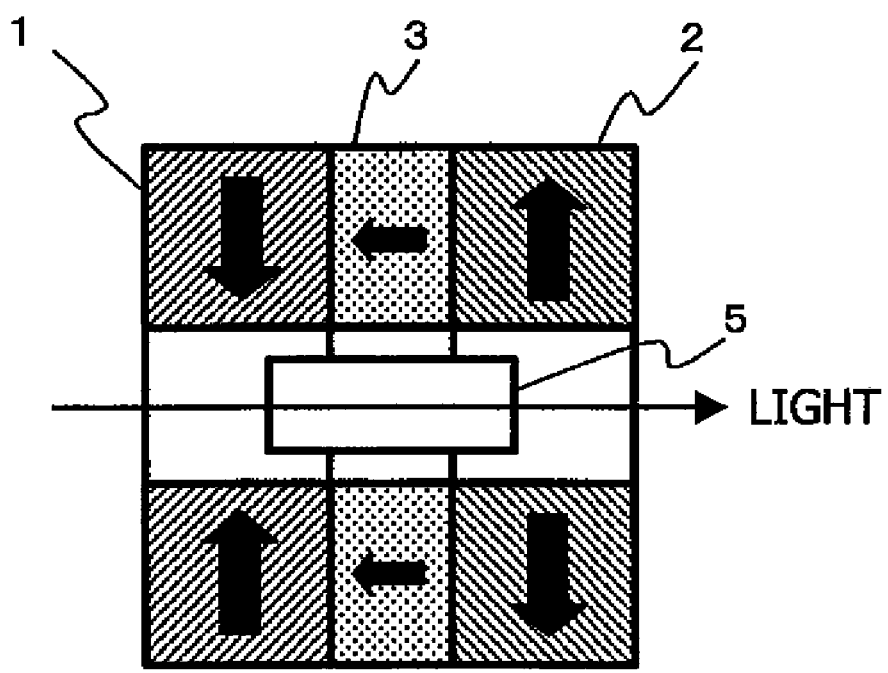
FIG. 2 is a schematic sectional view of the Faraday rotator according to the present invention.

FIG. 2 is a sectional view showing a Faraday rotator according to Example 1. In FIG. 2, reference numerals 1, 2 and 3 denote a first magnet, a second magnet and a third magnet, respectively, and their directions of magnetization are shown by black arrows. The magnets are each also provided with a hollow space (through-hole) at the center thereof.

The first magnet 1 stands magnetized in the direction that is perpendicular to the optical axis along which the light is to pass and the direction taken toward the optical axis from the outside. On the other hand, the second magnet 2 stands magnetized in the direction of magnetization that is perpendicular to the optical axis but the direction taken toward the outside from the optical axis as being opposite to that in the first magnet 1. The third magnet 3 is disposed between the first magnet 1 and the second magnet 2 and stands magnetized in the direction of magnetization that is perpendicular to the optical axis and the direction taken toward the first magnet from the second magnet.

A Faraday element 5 is also disposed at a central portion in the length direction of the through-hole (hollow spaces) provided through the first magnet, second magnet and third magnet.

Then, before the Faraday rotator according to Example 1 was produced, the magnetic-field distribution of a Faraday rotator in the optical-axis direction was examined by computer simulation making use of the finite element method (FEM), to make optimization so as to satisfy Expressions (1) and (2) shown previously, to secure a small volume as the Faraday rotator and further to be short as length dimension of the Faraday element.

Figure 4:
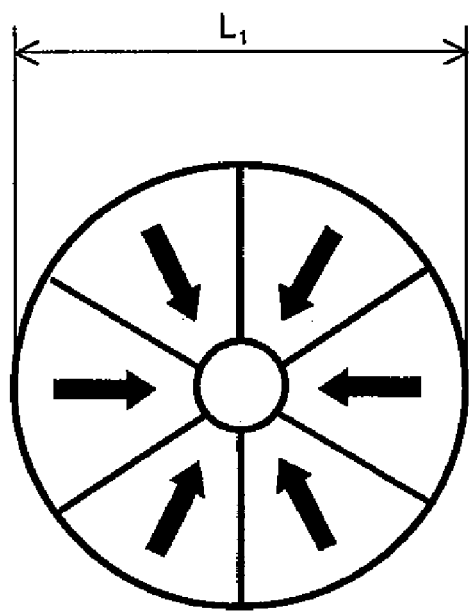
FIG. 4 is a schematic sectional view of a first magnet that is a constituent member of the Faraday rotator according to Example 1.

The magnets were each an Nd—Fe—B sintered magnet. As the Faraday element, TGG was used which was 3 mm in diameter and cylindrical. The first magnet 1 was made up of six magnet pieces as shown in FIG. 4, which were so shaped as to stand magnetized in the direction that is quasi-perpendicular to the optical axis. The second magnet 2 was also made up of six magnet pieces having the same size and shape as the first magnet 1, and stood magnetized in the direction inversely parallel to that of the first magnet 1. At the centers of the first magnet 1, second magnet 2 and third magnet 3, hollow spaces (constituting the through-hole) of 3.3 mm in diameter were provided so as for the Faraday element to be received therein.

Figure 3:
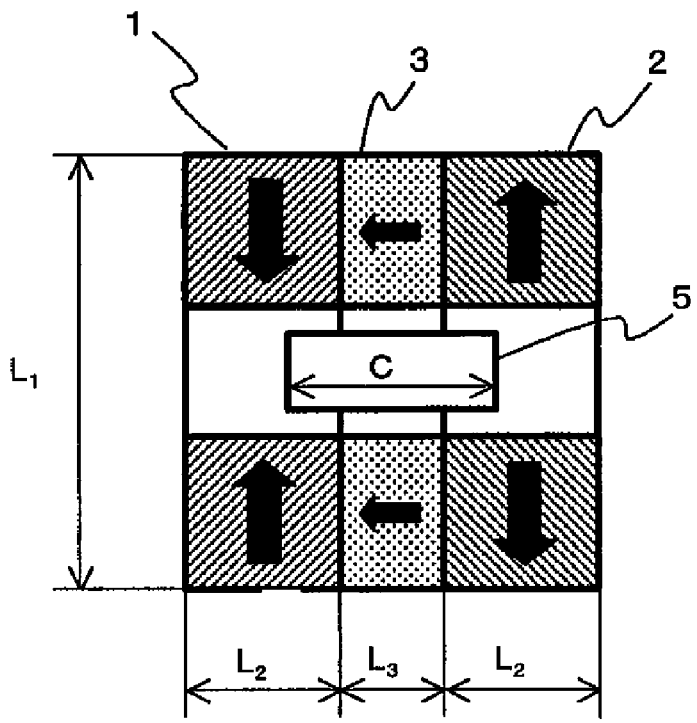
FIG. 3 is a schematic sectional view of a Faraday rotator according to Example 1.

The wavelength of light was 1,064 nm. So as to provide the Faraday rotation angle of 45°, outer diameter $L_1$ of the three magnets each, length $L_2$ of the first magnet 1 and that of the second magnet 2 in the optical-axis direction, length $L_3$ of the third magnet 3 in the optical-axis direction and crystal length C of the TGG on the optical axis were calculated by computer simulation. The relationship between $L_1$, $L_2$, $L_3$ and C is shown in FIG. 3. The results of the computer simulation are also shown in Table 1 below.

TABLE 1

| $L_1$ | $L_2$ | $L_3$ | C |
|---|---|---|---|
| 30 mm | 12 mm | 5 mm | 12 mm |

On the basis of the above results, three sets of the Faraday rotator according to Example 1 were produced, and the Faraday rotation angle was evaluated with use of fiber laser light of 1,064 nm in wavelength and 100 mW in light intensity.

As the result of evaluation, the Faraday rotation angle was found to be as good as 45±1°.

Next, the light was strengthened to 10 W in intensity and was continuously transmitted through the Faraday rotator, with the result that no change was seen in the Faraday rotation angle even with lapse of time and the TGG did not change in temperature.

Comparative Example 1

Figure 5:
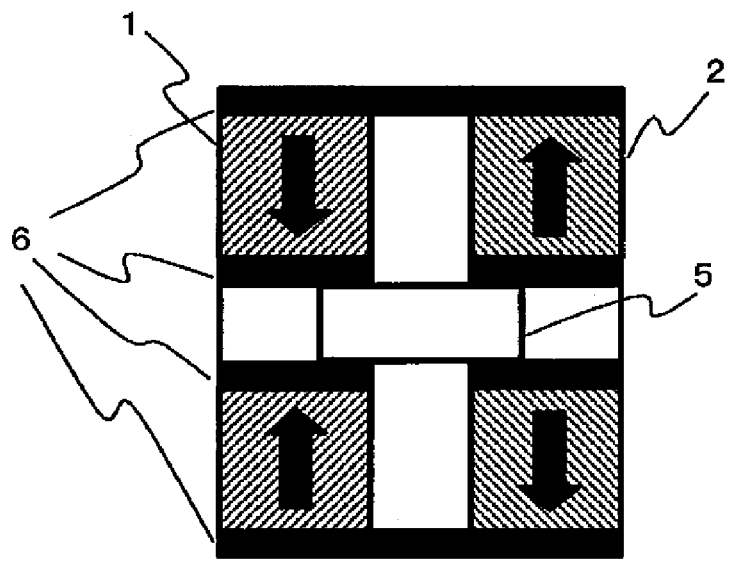
FIG. 5 is a schematic sectional view of a Faraday rotator according to Comparative Example 1 (prior art).

The Faraday rotator set up as shown FIG. 5 as disclosed in Patent Document 1 was assembled. As its first magnet 1 and second magnet 2, the same ones as those in Example 1 were used, and its sizes corresponding to $L_1$ to $L_3$ shown in FIG. 3 were set identical to those in Example 1. More specifically, the third magnet was not inserted between the first magnet 1 and the second magnet 2, thus a space was provided by the length $L_3$. Also, as shown in FIG. 5, the first magnet 1 and the second magnet 2 were covered on their outsides with cylindrical members 6 made of soft iron (a soft magnetic material) of 0.35 mm in thickness, and a cylindrical member 6 made of soft iron (a soft magnetic material) of 0.35 mm in thickness and 2.6 mm in inner diameter was inserted into the through-hole. Thus, different from Example 1, a cylindrical TGG of 2.5 mm in diameter was used as a Faraday element 5 according to Comparative Example 1, but the length of the TGG on the optical axis was set to be 12 mm like that in Example 1.

Then, the Faraday rotation angle was evaluated in the same way as in Example 1 to find that it was 27°, thus this Faraday rotator was not usable as that for optical isolators. This is due to the fact that the magnetic field applied to the paramagnetic material Faraday element 5 was insufficient.

Figure 6:
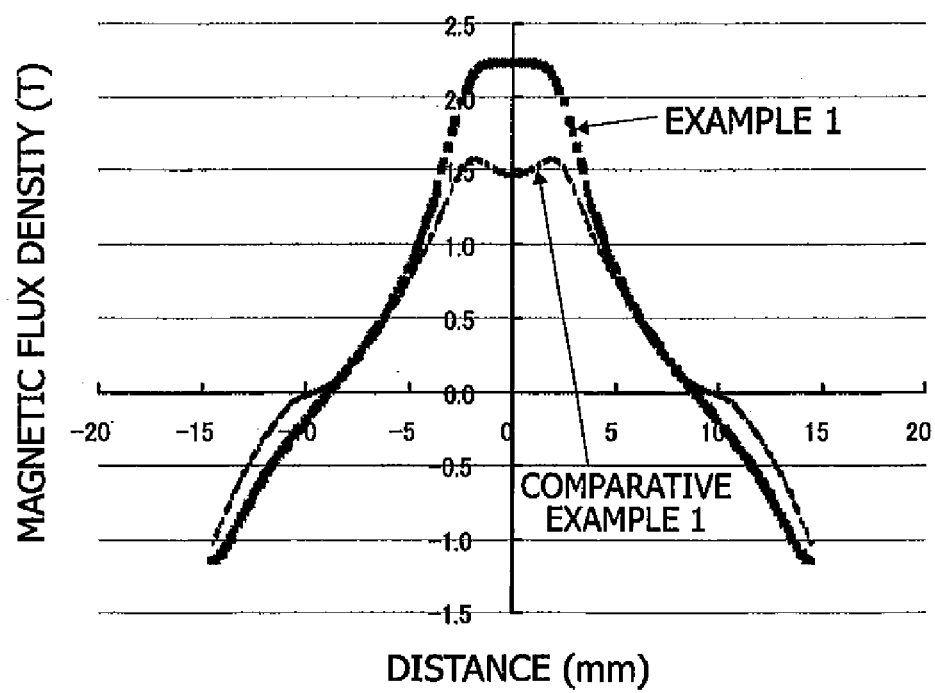
FIG. 6 is a graph showing comparison of magnetic field strength in the optical-axis direction, of the Faraday rotators according to Example 1 and that of Comparative Example 1.

The magnetic-field distribution on the optical axis in the Faraday rotator according to Comparative Example 1 was also examined by computer simulation. Results compared with that in Example 1 are shown in FIG. 6. As is evident from the graph of FIG. 6, the Faraday rotator according to Example 1 is seen to have attained a very great magnetic field around the center on the optical axis, compared with Comparative Example 1 (prior art). Thus, it is ascertained that the Faraday rotator of Comparative Example 1 (prior art) can not materialize the Faraday rotation angle of 45° as long as its magnets are the same in size, and its paramagnetic material is the same in length, as those of the Faraday rotator according to Example 1.

In the state that the diameter of TGG and the diameter of through-hole of the magnet are fixed, the Faraday rotator according to Comparative Example 1 was compared with the Faraday rotator according to Example 1 in regard to their volume of magnet and their length of TGG on the optical axis, by calculating from computer simulation the size at the time the Faraday rotation angle of 45° can be materialized. Results obtained are shown in Table 2 below. Here, in order to make the comparison easy, the magnet volume (a.u.) and TGG length (a.u.) of Example 1 were assumed as 1 to standardize their numerical values.

TABLE 2

|  | Example 1 | Comparative Example 1 (prior art) |
|---|---|---|
| Magnet volume (a.u.) | 1 | 2.1 |
| TGG length (a.u.) | 1 | 1.5 |

As can be seen from the numerical values in Table 2, it is ascertained that the Faraday rotator according to Example 1 is very suited for making the device compact, enables the Faraday element to be short in its length dimension on the optical axis, and hence can be kept from rising in temperature to keep a stable Faraday rotation angle.

Making the Faraday rotator compact also leads to the reduction of quantity in which the magnets and paramagnetic material are to be used, and hence promises a superior cost performance.

Example 2

Figure 8:
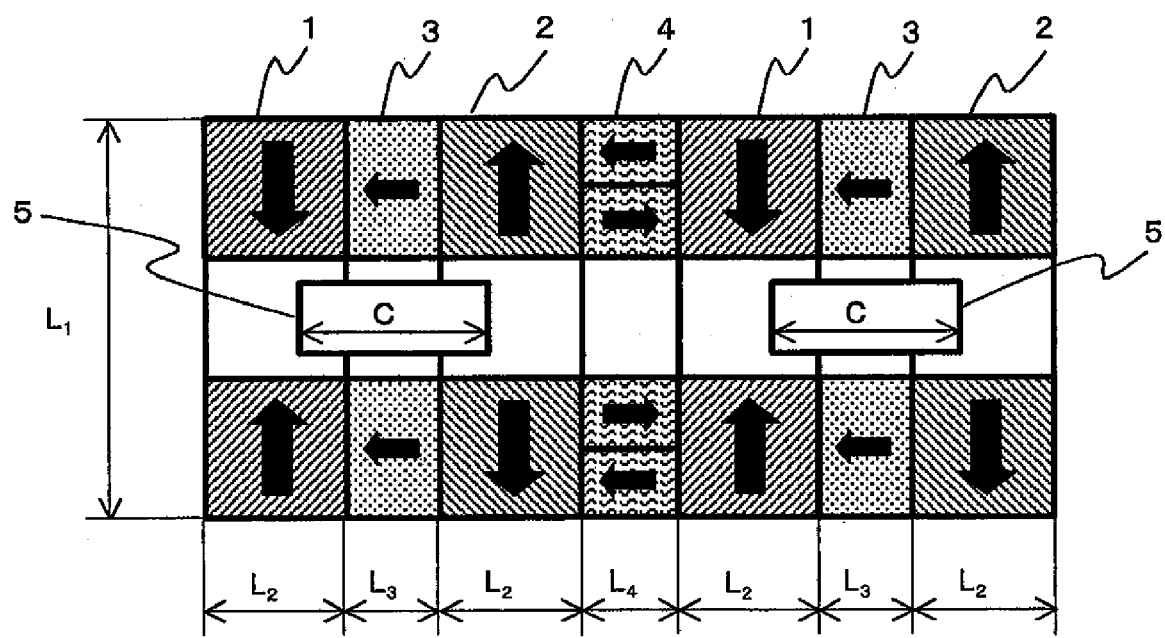
FIG. 8 is a schematic sectional view of a Faraday rotator according to Example 2.

A Faraday rotator was produced which was so structured that two Faraday rotators which are each the same as the Faraday rotator according to Example 1 were connected in series as shown in FIG. 8 and a pair of fourth magnets 4 constituted of an inside magnet and an outside magnet which stood magnetized in the directions that are each other inversely parallel to the optical-axis direction was inserted between the two Faraday rotators. Here, the inside magnet constituting part of the pair of fourth magnet 4 stood magnetized in the direction of magnetization that is parallel to the optical axis and the direction taken toward the second Faraday rotator on the right side in FIG. 8 from the first Faraday rotator on the left side in FIG. 8. The outside magnet also stood magnetized in the direction of magnetization that is parallel to the optical axis but the direction taken toward the first Faraday rotator on the left side in FIG. 8 from the second Faraday rotator on the right side in FIG. 8. Thus, the inside magnet and the outside magnet stood magnetized in the directions that are each other inversely parallel to the optical-axis direction.

Then, like Example 1, computer simulation was performed to make optimization so as to secure a small volume as the Faraday rotator and further be short as length dimension of the paramagnetic material.

As the magnets and the Faraday element, like Example 1, Nd—Fe—B sintered magnets and TGG which was 3 mm in diameter and cylindrical were used, respectively. The first magnet 1 and the second magnet 2 were each also made up of six magnet pieces like those in Example 1. At the centers of the respective magnets, hollow spaces (constituting the through-hole) of 3.3 mm in diameter were provided so as for the Faraday element 5 to be received therein.

The wavelength of light was 1,064 nm. So as for the two Faraday elements to provide the Faraday rotation angle of 45° in total, outer diameter $L_1$ of the four kinds of magnets each, length $L_2$ to length $L_4$, respectively, of the magnets in the optical-axis direction and crystal length C of the TGG on the optical axis were calculated by computer simulation.

The relationship between $L_1$, $L_2$, $L_3$, $L_4$ and C is shown in FIG. 8. The results of the computer simulation are also shown in Table 3 below.

TABLE 3

| $L_1$ | $L_2$ | $L_3$ | $L_4$ | C |
|---|---|---|---|---|
| 30 mm | 4 mm | 4 mm | 4 mm | 5 mm |

A Faraday rotator having the sizes shown in Table 3 was assembled, and light was transmitted therethrough to evaluate characteristics in the same way as in Example 1.

As the result of evaluation, the Faraday rotation angle at 100 mW in light intensity was found to be as good as 45±1°. Even when the light was strengthened to 10 W in intensity and was continuously transmitted through the Faraday rotator, no change was seen in the Faraday rotation angle and the TGG did not change in temperature. Incidentally, in comparison with Example 1, temperature characteristics were not ascertained to have been improved. However, since the crystal length of the TGG was set smaller, it is presumed that the device shows better temperature characteristics than that of Example 1 when the laser light intensity is further made higher.

Thus, the Faraday rotators according to Examples are very suited for making the device compact, enable the Faraday element to be short in its length dimension on the optical axis, and hence can be kept from rising in temperature to keep a stable Faraday rotation angle. In addition, making the Faraday rotator compact also leads to the reduction of quantity in which the magnets and paramagnetic material are to be used, and hence promises a superior cost performance.

POSSIBILITY OF INDUSTRIAL APPLICATION

The Faraday rotator according to the present invention is very suited for making the device compact and enables the Faraday element to be short in its length dimension on the optical axis, and hence it can be kept from rising in temperature to keep a stable Faraday rotation angle. Accordingly, it has a possibility of industrial application that it is usable in magnetic optical devices such as an optical isolator which is necessary to intercept light returning to a semiconductor laser to stabilize its lasing; the semiconductor laser being used in optical communication systems, laser processing systems and so forth.

What is claimed is:

1. A Faraday rotator which comprises a magnet member having at its center a through-hole through which light is to pass and a Faraday element comprising a paramagnetic material which is disposed inside the through-hole and through which the light is to be transmitted, wherein;

the magnet member is constituted of a first magnet standing magnetized in the direction of magnetization that is perpendicular to the optical axis and the direction taken toward the optical axis, a second magnet standing magnetized in the direction of magnetization that is perpendicular to the optical axis and the direction taken against the optical axis, and a third magnet disposed between the first magnet and the second magnet and standing magnetized in the direction of magnetization that is parallel to the optical axis and the direction taken toward the first magnet from the second magnet;

hollow spaces constituting the through-hole of the magnet member are provided at the centers of the first and second magnets and third magnet; the Faraday element is disposed at a central portion in the length direction of the through-hole constituted of these hollow spaces; and, where the length of the first magnet and that of the second magnet in the optical-axis direction are both represented by $L_2$ which are equal to each other and the length of the third magnet in the optical-axis direction is represented by $L_3$, the relationship of the following Expression (1) is established:

$$L_2/10 \leq L_3 \leq L_2. \quad \text{Expression (1)}$$

2. A Faraday rotator which comprises two sets of the Faraday rotator according to claim 1 which are connected in series in the optical-axis direction, where a pair of fourth magnets constituted of an inside magnet having a hollow space communicating with through-holes of a first Faraday rotator and a second Faraday rotator and an outside magnet having a hollow space larger than the outer diameter of the inside magnet and into the hollow space of which the whole inside magnet is kept fitted is disposed between the first Faraday rotator and the second Faraday rotator and in which the inside magnet and the outside magnet stand magnetized in the directions of magnetization that are parallel to the optical axis and the directions opposite to each other.

3. The Faraday rotator according to claim 2, wherein the pair of fourth magnets the whole inside magnet of which is kept fitted to the hollow space of the outside magnet have a length of $L_2/2$ or more in the optical-axis direction.

4. The Faraday rotator according to claim 2, wherein the whole or some part of the hollow space in the third magnet has a larger diameter than the hollow spaces in the first magnet and second magnet.

5. The Faraday rotator according to claim 3, wherein the whole or some part of the hollow space in the third magnet has a larger diameter than the hollow spaces in the first magnet and second magnet.

6. The Faraday rotator according to claim 2, wherein the first magnet and the second magnet each comprise combination of a plurality of magnet pieces.

7. The Faraday rotator according to claim 3, wherein the first magnet and the second magnet each comprise combination of a plurality of magnet pieces.

8. The Faraday rotator according to claim 4, wherein the first magnet and the second magnet each comprise combination of a plurality of magnet pieces.

9. The Faraday rotator according to claim 1, wherein the whole or some part of the hollow space in the third magnet has a larger diameter than the hollow spaces in the first magnet and second magnet.

10. The Faraday rotator according to claim 1, wherein the first magnet and the second magnet each comprise combination of a plurality of magnet pieces.

11. The Faraday rotator according to claim 9, wherein the first magnet and the second magnet each comprise combination of a plurality of magnet pieces.

* * * * *